US012655358B1

(12) United States Patent
Storey et al.

(10) Patent No.: US 12,655,358 B1
(45) Date of Patent: Jun. 16, 2026

(54) PLASTIC RECYCLING SYSTEM AND RECYCLING METHOD FOR USE IN A PLASTIC PROCESSING FACILITY

(71) Applicant: Freepoint Commodities LLC, Stamford, CT (US)

(72) Inventors: Geoffrey Storey, Weston, CT (US); Joe Byrom, Jr., Cypress, TX (US)

(73) Assignee: Freepoint Commodities LLC, Stamford, CT (US)

( * ) Notice: Subject to any disclaimer, the term of this patent is extended or adjusted under 35 U.S.C. 154(b) by 0 days.

(21) Appl. No.: 19/197,427

(22) Filed: May 2, 2025

Related U.S. Application Data

(60) Provisional application No. 63/642,388, filed on May 3, 2024.

(51) Int. Cl.
| | |
|---|---|
| *C10G 1/10* | (2006.01) |
| *B09B 3/32* | (2022.01) |
| *B09B 3/35* | (2022.01) |
| *B09B 3/40* | (2022.01) |
| B09B 101/75 | (2022.01) |

(52) U.S. Cl.
CPC .................. *C10G 1/10* (2013.01); *B09B 3/32* (2022.01); *B09B 3/35* (2022.01); *B09B 3/40* (2022.01); *B09B 2101/75* (2022.01); *C10G 2300/1003* (2013.01)

(58) Field of Classification Search
CPC .... C10G 1/10; C10G 2300/1003; B09B 3/35; B09B 3/40; B09B 3/32; B09B 2101/75
See application file for complete search history.

(56) References Cited

U.S. PATENT DOCUMENTS 11,517,911 B2 * 12/2022 Schiffer .............. B02C 18/2291

FOREIGN PATENT DOCUMENTS

WO      WO-2024050217 A1 *  3/2024  ............... C10G 1/10

* cited by examiner

*Primary Examiner* — Youngsul Jeong
(74) *Attorney, Agent, or Firm* — Leason Ellis LLP

(57)      ABSTRACT

A multi-line plastic processing system for producing a finished feedstock product that is suitable for undergoing subsequent processing is provided and includes a plurality of feedstock lines for receiving and processing different plastic feedstock materials. The system also includes a densification station for densifying one or more processed plastic feedstock materials and a storage station for storing the finished feedstock product. The system is configured such that a plurality of output streams from the plurality of feedstock lines define the finished feedstock product and at least one of the plurality of output streams comprises a non-densified output stream that bypasses the first densification station.

27 Claims, 4 Drawing Sheets

PLASTIC RECYCLING SYSTEM AND RECYCLING METHOD FOR USE IN A PLASTIC PROCESSING FACILITY

CROSS-REFERENCE TO RELATED APPLICATION

The present application claims priority to and the benefit of U.S. patent application Ser. No. 63/642,388, filed May 3, 2024, which is hereby incorporated by reference in its entirety.

TECHNICAL FIELD

The present application is directed to a system and method to be implemented in a mixed plastic processing facility to sort, blend and otherwise process input material to optimize polyolefin recovery for various uses including the optimized conversion of such material into liquid hydrocarbons. The system architecture and design described herein allows the operator to process material comprised of different types of waste plastic (e.g., low-density polyethylene), in multiple compositions and forms (e.g., flakes, rigids, films, dust and fines, shred, granules, cubes, pellets and rolls), in a manner that enables the creation of customized forms and blends of mixed densified plastic product ("finished feedstock product") that may be used as a precursor feedstock for various applications, including for the recycling or manufacturing of such product into an intermediate liquid hydrocarbon product. The employment of multiple independent infeed lines allows for a greater variety of materials to be received and independently introduced to corresponding infeed lines and allows for the designation of which lines are operated and which are placed in offline states and allows for the selection of custom processing pathways for the processed material based, at least in part, on which materials constitute the infeed materials.

SUMMARY

In one embodiment, a multi-line plastic processing system is disclosed for producing a finished feedstock product that is suitable for undergoing subsequent processing. The system comprises a plurality of feedstock lines for inputting different plastic feedstock materials. The system further includes a first densification station for densifying one or more processed plastic feedstock materials and a second densification station for densifying one or more different plastic feedstock materials. The first densification station utilizes a densification process that is different than a densification process at the second densification station. The system further includes one or more bidirectional conveyors that are in communication between at least two feedstock lines. At least one bidirectional conveyor extends between a first mixing bin and a second mixing bin. The first mixing bin is immediately upstream of the first densification station and the second mixing bin is immediately upstream of the second densification station. The system further includes a storage station for storing the finished feedstock product. The system is configured such that a plurality of output streams from the plurality of feedstock lines define the finished feedstock product and at least one of the plurality of output streams bypasses the first and second densification stations and is free of being subjected to densification. In yet another aspect, the system can include one or more sizing stations, one or more sorting stations, one or more fine shredding stations, and one or more cleaning stations. Moreover, the system is configured such that one or more different plastic feedstock materials can bypass one or more stations selected from the group consisting of the one more sizing stations, the one or more sorting stations, the one or more fine shredding stations and the one or more cleaning stations. The interconnections and/or interplay between the plurality of feedstock lines and the creation of bypass pathways can be based at least in part on the material characteristics of the feedstock materials and/or the desired material characteristics of the output steams and/or the material characteristics of the desired final feedstock material.

BRIEF DESCRIPTION OF DRAWING FIGURES

The present invention may be appreciated by reference to the following descriptions and drawings, in which.

DETAILED DESCRIPTION OF CERTAIN EMBODIMENTS

The present system and method for implementation in a plastic recycling facility will be best understood with reference to the attached figures. It will be appreciated that the various stations and/or processing steps illustrated along each infeed line are only exemplary in nature and not limiting of the scope of the present invention. In particular, a line can include more or less stations/processes and can include different types of stations/processes.

Figure 1:
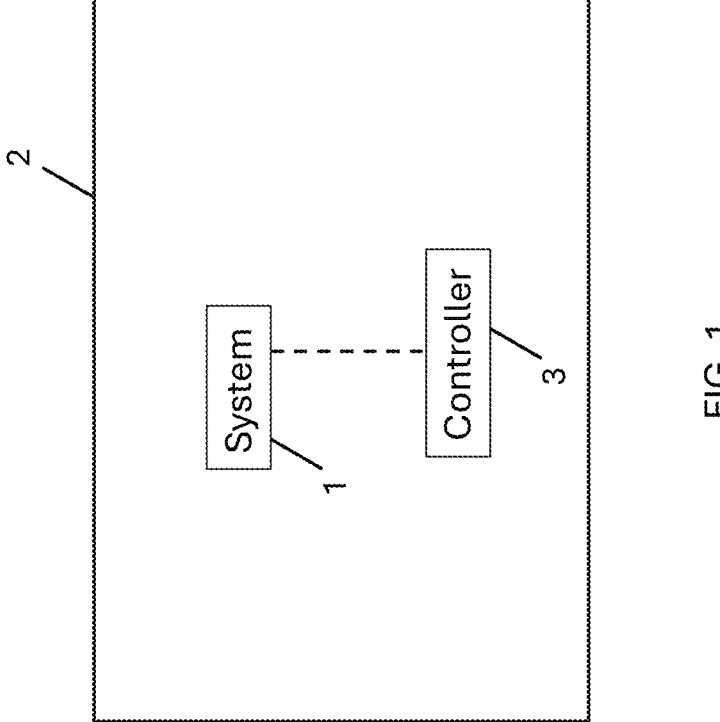
FIG. 1 is a block diagram illustrating an exemplary plastic recycling plant that includes one or more plastic recycling systems in accordance with the present disclosure.

In the attached FIG. 1, one exemplary plastic processing (recycling) system is indicated by the reference character 1. The system 1 is intended for use in a plastic processing plant 2 that is configured to receive the infeed (feedstock) materials, to process these infeed materials using the system 1 and then ultimately store the finished feedstock product for future transport.

In one or more embodiments, the plastic processing system 1 employs hardware and software that provide functionality to control operation of the various infeed lines and control other line operating parameters. Computer programs (and other executable instructions) and data can be stored on a machine-readable medium that is accessible by one or more processors for providing functionality shown and described herein. Various forms of computing devices are accessible to a network and can communicate over the network to the various machines that are configured to send and receive content, data, as well as instructions that, when executed, enable operation of the components of the plastic recycling system 1. The content and data can include information in a variety of forms, including, as non-limiting examples, mass, throughput, text, audio, images, and video, and can include embedded information such as links to other resources on the network, metadata, and/or machine executable instructions. Each computing device can be of conventional construction, and while discussion is made in regard to servers that provide different content and services to other devices, such as mobile computing devices, one or more of the server computing devices can comprise the same machine or can be spread across several machines in large scale implementations, as understood by persons having ordinary skill in the art. In relevant part, each computer server has one or more processors, a computer-readable memory that stores code that configures the processor to perform at least one function, and a communication port for connecting to the network. The code can comprise one or more programs, libraries, functions or routines which, for purposes of this specification, can be described in terms of a plurality of modules, residing in a representative code/instructions storage, that implement different parts of the process described herein.

Further, computer programs (also referred to herein, generally, as computer control logic or computer readable program code) can be stored in a main and/or secondary memory and implemented by one or more processors (controllers, or the like) to cause the one or more processors to perform the functions of the invention as described herein. In this document, the terms "memory." "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; or the like.

In view of the foregoing, it will be understood that the system 1 is largely an automated system with sensory feedback and therefore, the processing equipment at the various stations and motorized conveyors, etc. described herein are preferably in communication with and controlled by a master or main controller 3 shown in FIG. 1. The system 1 is connected to the controller 3 either in a wired manner and/or wireless manner, with the controller 3 being configured to allow the operator to control, as by a graphical user interface (GUI), the operation of each infeed lines. The controller 3 allows the operator to activate and place offline any given infeed line, designate the direction of reversible belts depending on infeed form (2D vs. 3D), and perform many other operations, as well as observe the operation of the system. For ease of simplicity, FIG. 1 shows each system 1 communicating with one controller 3; however, it will be understood that each system 1 can have its own dedicated controller 3.

Figure 2:
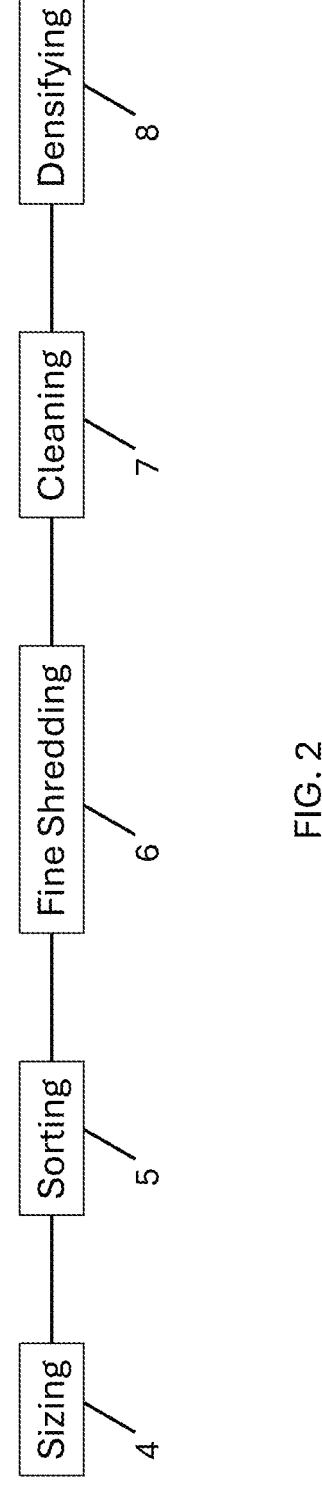
FIG. 2 is a block diagram illustrating exemplary stations of the disclosed plastic recycling plant.
Figure 3:
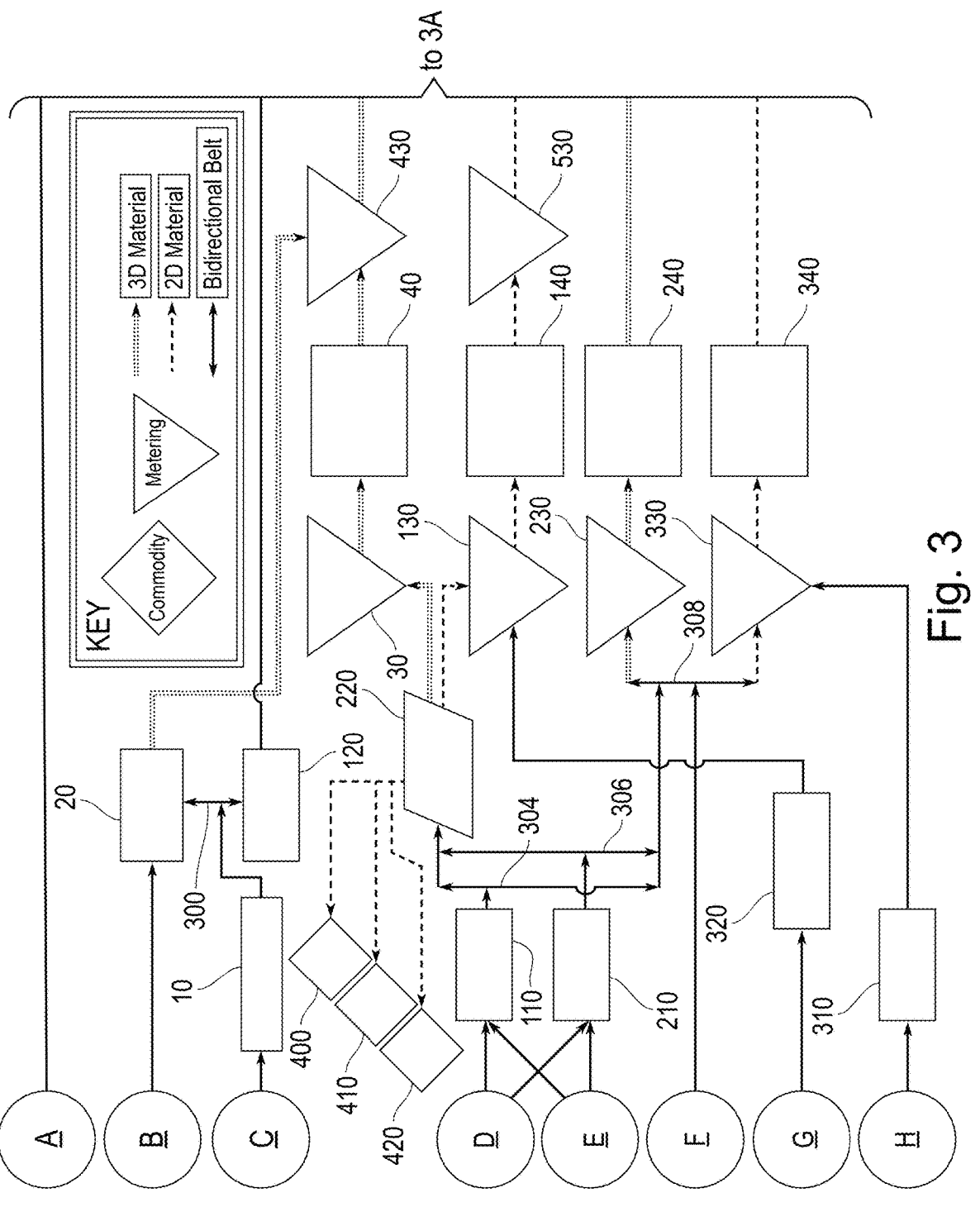
FIGS. 3 and 3A are a schematic illustrating one exemplary plastic recycling system.
Figure 3A:
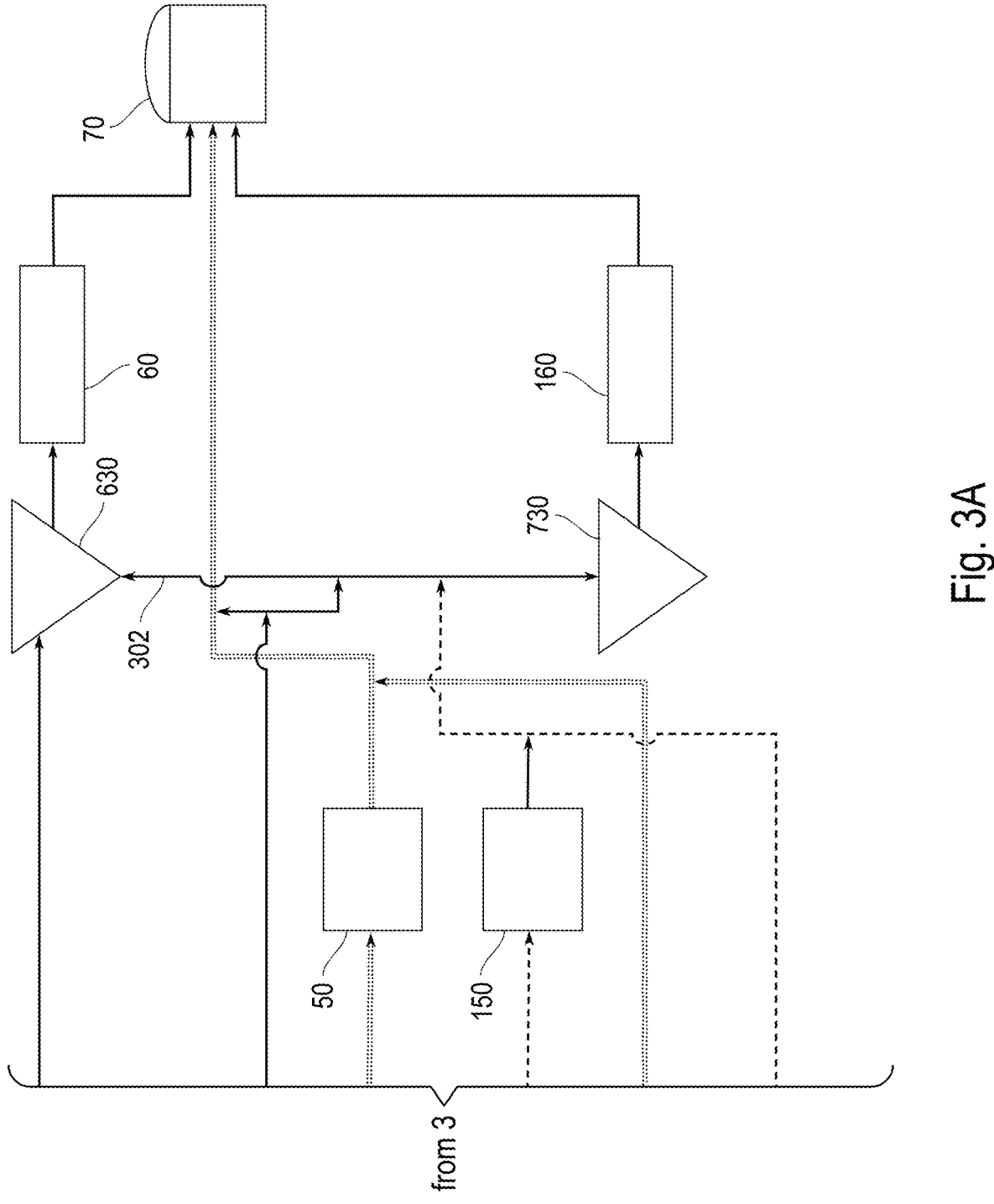

As described herein, one primary advantage of the disclosed system 1 is that it combines the primary activities of two otherwise distinct facilities, namely, a material recovery facility (MRF) and a mechanical plastic recycling facility, under a "single roof" with a condensed footprint to allow for centralized processing at one location. In other words, the system 1 is at a single site location at which all of the feedstock lines, shown in FIGS. 3 and 3A are located under one roof. FIG. 2 sets forth a block diagram listing exemplary types of stations and processing steps that are employed in the present system 1. Generally, the system 1 includes: one or more sizing stations 4, one or more sorting stations 5, one or more fine shredding stations 6, one or more cleaning stations 7, and one or more densification stations 8. A traditional MRF may include stations 4 and 5 but not stations 6-8, while a traditional mechanical plastic recycling facility may include stations 6-8 but not stations 4 and 5.

As is understood, in a plastic recycling plant, such as plant 2, densification involves increasing the mass per unit of volume of the plastic, making it easier and more economic to store, transport, and process. This step typically includes processes like shredding, grinding, compression, pelletizing, agglomerating, extruding, or briquetting. Densification reduces the volume of a given plastic and creates a form that facilitates further processing.

FIGS. 3 and 3A illustrate one exemplary plastic processing system 1 that is particularly suited and configured to process multiple infeed lines (e.g., infeed lines labeled A to H that correspond to the infeed materials A to H) with distinct characteristics and produce a finished feedstock product that is suited for subsequent processing via pyrolysis into liquid hydrocarbons. The end-product of the present process is referred-to as a finished feedstock product because it may be formulated to meet precise use-dependent specifications. It will be appreciated that the present system 1 and method can be implemented in many different applications, with one exemplary one being the pyrolysis application mentioned above.

The disclosed system 1 allows for more effective processing of diverse types of plastic waste into optimized feedstocks. For the pyrolysis use-case described herein, the disclosed system 1 has several advantages. For example, control of the inbound feedstock minimizes unexpected chemical reactions that may corrode equipment. Additionally, efficient removal of contaminants from the feedstock results in higher purity of the pyrolysis product (i.e., liquid hydrocarbons) and a reduction in waste byproducts (such as char). Moreover, by enabling the production of a finished feedstock product meeting specifications tailored to meet the requirements of specific equipment, pyrolysis production yield may be optimized.

The benefits associated with the present system 1 are not limited to just a pyrolysis use-case but will enable finished feedstock produced for other uses to be optimized in other settings and other plant types as mentioned herein.

As described herein, the disclosed system 1 and processing method are configured to produce a finished feedstock product which may be comprised of different combinations of multiple plastic resin types in various forms such as granules, pellets, and shredded materials. As shown in the figure, the depicted system 1 and processing method employ multiple techniques, including but not limited to, shredding, agglomeration, pelletizing, and extruding, to produce a finished feedstock product that meets desired specifications, including with respect to bulk density and flowability, to optimize the end-product for use in various settings. The finished feedstock product can be stored as individual fractions (e.g., flakes, granules, cubes, pellets, etc.) or can be stored in a blended state.

The system 1 includes several processing stages that can broadly be categorized into sizing, sorting, fine shredding, cleaning, and densifying. Not all input material (infeed material) requires each of these steps, so the system 1 enables bypassing and other means of operational flexibility for processing various materials through the system. This is in contrast to conventional line design in which infeed material is delivered to a single infeed line and the infeed material travels and is subjected to processing at sequential stations some of which are not necessary. In other words, a conventional single line design is restrictive, inefficient, and does not permit customization of the processing steps that are employed in processing the infeed material. Additional features and benefits of the system 1 and processing method are described below.

It will also be appreciated that while the system 1 is described herein as being a plastic processing system, at least certain features of the system architecture described herein can be implemented in other processing and recycling environments beyond plastics.

The disclosed system 1 and recycling processing method described herein offer the following advantages. The below features are best understood with reference to the attached figures.

Converging Lines and Reversing Conveyors→Preserve Capacity and Increase Utilization The use of bidirectional conveyor belts and several converging lines allow for specific selection of how each type of feedstock is processed. Such features permit the control of how material progresses through system if material does not need each of the sizing, sorting, fine shredding, cleaning, and densifying steps. Bidirectional belts act as control mechanisms to allow material to bypass unnecessary processing steps, as they can be directed elsewhere through converging lines in the system 1. Instead of going to an unnecessary step, the operator can change the direction of the belt (i.e., the operating direction) to send it to an alternate processing station. The converging points in the lines serve as intermediate locations for better control of material flow. For instance, traditional facilities (single line processing) may run all inbound material through a shredder if there is not enough flexibility to redirect supply, whereas the present system 1 has the capability to divert material that does not need size reduction from the sizing station. The ability to avoid unnecessary processing preserves equipment capacity for alternate material, resulting in more efficient capacity utilization, as less equipment is required to achieve a constant throughput.

Inputting pre-sorted, medium-sized plastic is an example of how material can bypass unnecessary processing through connected lines, as such material that is already in a sorted plastic fraction and can bypass the initial sizing and sorting steps. Referring to the attached FIGS. 3 and 3A, this option be seen with infeed C, which avoids the initial sizing steps at stations 110 or 210, as well as sorting equipment in stations 20, 120, or 220. Material that does not need sortation may flow through the air classification step with the equipment turned off to continue to the rest of the line. Instead, the operator can feed material into infeed C that goes straight to a granulator at station 10 for fine shredding, which may then converge with material from other lines at station 630 or 730. From there, all material is sent to the appropriate densifying step (e.g., agglomeration station 60). Because material is aggregated again at a converging point, all upstream equipment's capacity can be sized accordingly, and the capacity of a certain piece of equipment is not wasted on a material that does not need that type of processing. This example of a separate infeed for bypass of sizing and sorting preserves capacity on major equipment, including, but not limited to shredders, optical scanners, screens, or elliptical separators that are part of the sizing and sorting steps. Thus, infeed C is routed along a path that delivers the material to only the stations or equipment that are necessary for the further processing of this material.

An instance of a bidirectional belt 300 can be seen just downstream of station 10 from infeed C. The bidirectionality of the belt 300 permits material to be delivered either to the density separation equipment at station 20 or the air classification equipment at station 120. If certain material does not require both of those processes, instead of sending the material through both stations 20 and 120 sequentially, the system 1 allows the operator to choose which station it needs to go to. If a material run during one shift needs density separation, and a different material in another shift needs air classification, then the operator can elect to reverse the direction of the belt 300 to move material directly from station 10 to station 120. In that case, the bidirectional belt 300 frees up capacity on the equipment in station 20 so that alternate material can be run there concurrently through infeed B. The bidirectional belt 300 in this case not only preserves capacity, but it also increases the production capacity.

Additional bidirectional belts are described herein and function in a similar fashion.

With reference to FIGS. 3 and 3A, the bidirectional belt 302 between the mixing bins 630, 730 allows for flexibility to select between densification technologies that are employed at densification stations 60, 160. The bidirectional belts 304, 306 are located after the sizing shredders at stations 110 and 210. These bidirectional belts 304, 306 allow for material from either infeed line D or line E to be connected to station 220, the primary sorting line, or bypass the line by going down to stations 230 or 330, depending on the material form. Material that goes through station 220 requires sortation (e.g., post-consumer material with contaminants), whereas material going to 230 or 330 is relatively free of contaminants.

In one embodiment, the densification stations 60, 160 are configured to form and output two different densified plastic materials that differ in one or more ways. For example, the size and/or shape of the two different densified plastic materials can differ (e.g., granules vs. cubes/pellets) and/or one or more other material characteristic can be different between the two different densified plastic materials. It is also possible for the two different densification stations 60, 160 to be of the same type to yield the same type of densified plastic material output.

The present method allows for the selection of processing steps to meet finished product requirements. For instance, films and flexible plastics, such as agricultural film or post-consumer bags, require densification, while bulky, rigid plastic, such as buckets or containers, require fine granulating, and powders and fines require agglomeration. More specifically, if, for example, input material is comprised of large 3D forms, such as bales of clean, sorted rigid containers, material would need size reduction and fine shredding to meet finished feedstock product specifications. From there, the operator can select infeed E and bypass unnecessary processing steps, such as dry cleaning or agglomeration. Thus, the processing system 1 allows for any relevant material to be processed according to its specific characteristics: in this example, low contamination levels, large material size, and rigid form. In contrast, traditional plastic processing facilities use one-line systems that have the infeed pass-through all steps of the process in a set order, (1, 2, 3, 4 . . . ). The disclosed system 1 provides for a variable mix of input plastics to be processed in a customizable sequence based on their specific characteristics. The various infeed materials are further described herein.

As noted, certain types of plastic input material must be densified in the production of finished feedstock product for certain uses. The present system 1 provides for the utilization of several different densification options including via the pelletizing, agglomerating, cubing, and/or extruding of input material. This allows for flexibility and optimization in the processing of varied input material types. Processing lines may converge onto a central bidirectional belt, which combines material from different input lines to meet for central densifying without requiring additional equipment. This eliminates the need to have one densification station after each line. For instance, if there are four densification options, the upstream process may connect at one belt to select the optimal type of densification for any particular type of material.

The system 1 also allows for the processing of "clean" and "dirty" material. Material is typically described as "clean"

when it has low moisture content and has minimal fines, such as dirt or dust. Examples of clean material include most post-industrial waste plastics that are typically generated from manufacturing scrap. Material is considered "dirty" when it contains high moisture and has significant fines contamination. Examples of "dirty" material include (i) a potato chip bag with some residual food that may be captured in a bale of post-consumer material or (ii) agricultural film waste that may contain dirt or rocks. Specific processing equipment, such as the dry-cleaning station (station 150) can decrease moisture content and remove small contaminants in the material stream. The current system 1 provides for clean and dirty material to be processed separately so that clean material can bypass the unnecessary cleaning step. The separation of dirty and clean material reserves cleaning equipment capacity for dirty material and reduces the need for, and utilization of, such equipment. Material can be directed to either the clean processing line, which involves fine shredding, or the dirty processing line, which involves fine shredding, dry cleaning, and/or other processes to clean and dry the material. After cleaning, both streams can be combined again for densification. The ability to specifically dry dirty material is key for downstream processing and can help achieve low moisture specifications for finished feedstock product.

In sum, the features described above enable input materials with varying characteristics to be processed based on their specific characteristics. Minimizing unnecessary processing preserves equipment capacity, which enables operations in a smaller footprint and a higher production rate than a traditional facility with comparable infeed capacity.

Feed and Sort Redundancy→Operational Efficiency

It will also be understood that other feed lines can be offline when not used. For example, if as in the attached figure, there are eight infeed lines (A to H), it may be that only four of the infeed lines are utilized while the other lines are offline. If the facility is outputting the target amount of finished feedstock product with only four lines, then the saved capacity from not running and turning off the equipment in the remaining four lines also provides operating cost savings.

The number of infeed lines provide excess capacity and ensure that production capacity is not limited by certain lines being offline. If a shredder is offline for maintenance, other lines can be used to process alternate material types to meet production quantities. This way, different parts of the lines can be turned off for maintenance because there is sufficient redundancy and alternate capacity at the front of the line and a few different types of processing equipment so that the facility can run other material and still produce outputs. As illustrated in FIGS. 3 and 3A, conveyors from both infeed line D and line E are able to feed either shredder at station 110 or station 210. Further, the system 1 is interconnected downstream, so there are alternate paths to different processing stations. If the conveyor from infeed line D to station 110 is offline for service or maintenance, material can be fed with the conveyor from infeed line E. Either way, there are two infeeds (feedstocks) that can feed to either of the two shredders at station 110 and station 210. If both infeeds D and E are used to send material through station 220 and either 230 or 330, then infeed F can be offline for maintenance.

The stations and process steps are specifically tailored for the given feedline based on the characteristics of the feedstock being run through that line, and this optionality preserves equipment capacity and frees processing capabilities. In short, because the system 1 permits certain processes to run while other processes are unused, the production of finished feedstock product may continue even when individual pieces of equipment are down for maintenance. Efficient maintenance schedules allow for operational efficiency for the facility, as certain parts of the operation have different uptimes. For instance, high uptimes are optimal for the densification processes in the design, as densification is the final step of creating the finished feedstock product. The upstream feedstock preparation and main sortation equipment require more downtime for regular maintenance activities, so allowing parts of the line to undergo routine maintenance while other lines are running enables a sustained stream of feedstock for the densification processes.

Multiple Sortation Technologies→Widest Variety of Waste Plastic Sources

As previously discussed, the system 1 has several infeed lines (e.g., A to H) with varying types of equipment at one facility to increase the range of materials that can be processed. For instance, the system 1 has equipment for air classification, roll cutting, dry cleaning, and density separation. Not all material requires each of the listed processing before meeting the specification for finished feedstock product. The system 1 allows for a tremendous variety of input materials streams, including post-consumer single stream bales, commercial and distribution center bales, residue streams from other recyclers, agricultural waste and manufacturing waste. Infeed materials may be distinguished by contamination levels, size, or forms, and the diversity of processing equipment enables different materials to be processed differently based on those specific characteristics. This is in contrast to a single line type processing system that is traditionally employed.

The variety of equipment types in the system 1 extends beyond broad categories of processing, as even the initial sizing step includes several options of primary size reduction. For the sorting step, there is a selection between either a hook shredder 110 or a rotor shredder 210, as there are subtle differences in how these shredders can process various types of material. As shown in FIG. 3, the hook shredder and rotor shredder 210 are separate pieces of equipment at different locations. Depending on the material type, there is an optimal type of shredder configuration that can yield a better cut in the material or cut more efficiently with a higher throughput. This example shows how multiple technologies are utilized in the system 1 to accept a variety of plastic sources.

The multi-line design of the system 1 and the plant also allows for the processing of more seasonal or otherwise limited material streams. Seasonal material streams may include agricultural film waste, which has higher generation depending on harvest or growing season. Traditional recycling facilities may not be able to accommodate the influx of additional material types because it may not be cost-effective to invest in the specialized types of equipment required for processing limited streams if such equipment sits idle when those streams are not received. The system 1 has a selection of processing equipment to handle different material as needed so that when certain parts of the line, which may accommodate seasonal material, are not utilized, there is still sufficient processing capacity to sustain finished feedstock product production.

As a result, the system 1 can be broadly thought of as having one or more stations that perform the following steps:

Sizing→Sorting→Fine Shredding→Cleaning→Densifying; and within each of these steps, there are various types of equipment to fully accommodate different material processing requirements. Certain methods are better suited for certain material types. For example, the densification step can be performed by several different densification equipment types, including agglomeration (station 60) or making cubes or pellets (station 160). Different infeed materials are better suited for different types of densification. In particular, film material does better with densification without rigids and thus, as shown in FIGS. 3 and 3A, this type of infeed material takes a processing pathway that is different than the processing pathways of other infeed materials. With respect to sizing equipment, there are nuances between hook shredders, rotor shredders, and granulators, which have different knife configurations for differentiation in cutting methods. With respect to sorting, the system 1 utilizes mechanical sorting in station 220, relative density separation with water (station 20), and air density classification (station 120).

Different Infeed Lines & Metering/Connection Points→In-Line Blending for Target Composition.

It will be understood that the plastic processing facility can include a plurality of infeed (feed) lines that have separate start points and metering stations to serve as downstream connection points. The present system 1 and method afford the ability to tailor the composition of the finished feedstock product by allowing multiple input streams with different feedstock compositions to run through the system 1 and get blended together to meet a target composition.

As described herein, each infeed line (A to H) receives a different type and quality of feed for processing. The sortation process of each line creates a specific quality composition of finished feedstock. That quality composition can include, for example, particular percentages of polyolefin content (e.g. x percent low-density polyethylene (LDPE), y percent high-density polyethylene (HDPE), z percent polypropylene (PP)), as well as a composition limit of contaminants, such as halogens. The lines A-H can run concurrently and at targeted rates to allow for downstream combination of various compositions to reach a final blended composition. The ability to combine different plastic streams optimizes both the consistency and quality of the final product's targeted composition. As used herein, an initial starting station for each line A-H is represented by the first station that is downstream of the respective circle in FIG. 3 that represents a starting point for each line. For example, for line B, the first processing station is station 20; for line G, the first processing station is station 320, for line E, the first processing station is station 110 or 210, etc.

Blending different resin types and forms can also achieve a desired form in the densifying step because each resin type has distinct chemical characteristics. Densification may involve frictional heat to compact materials, so adding a blend of different resins with varying melting points can create a product with a higher bulk density. For example, material A could create a product with a bulk density of 15 lb/ft3, material B results in 30 lb/ft3, and a blend of materials A and B results in 25 lb/ft3. In that case, blending material B in with material A in a desired proportion can create a finished feedstock product meeting a target bulk density that has been optimized for further processing. It will be appreciated that in the above example, the materials A and B can comprise the outputs of two different lines.

It will also be appreciated from the figure that there can be connection points (convergence points) at which two or more lines interconnect downstream of the initial entry points of feedstocks (e.g., infeeds A to H). There are metering bins used throughout the process at these interconnection points in order to facilitate the combination of different material streams through the system as each material is processed according to its specific characteristics. These metering bins serve as an intermediate point for the mixing of materials. The aggregation of different lines of materials into one vessel enables an automatable blending application that eliminates the need for manual blending. The different connection points created by the metering stations throughout the line allows the operator to facilitate blending remotely after infeed by selecting how material is fed into the various infeed lines. This allows for the controlled blending of materials, which is not seen at other plastic processing facilities which generally use independent lines that are not connected.

The system 1 enables the creation of output products with a range of chemical compositions, each meeting desired specifications, within one system. During operations, output product composition can be customized through control of the processing of input materials. The various convergence points in the processing system enable blending of materials of different resins and forms from different infeed points. Such in-line blending is advantageous, as it minimizes the amount of manual labor (e.g., forklift operators) required to move and manually blend materials at a centralized location. Reducing the traffic associated with manually moving material for blending also reduces injury and accident risk and promotes a safer environment.

Since the system 1 described herein involves multiple infeed lines (A to H) that may be run in any number of combinations with other selected lines and metering stations, the operator can combine different materials to produce output products that meet desired specifications. This allows for unique customization of the process not available in independent systems without connection points. In any event, it will be understood that the existence of multiple infeed points and convergence points within the system enables the production of a desired finished feedstock product that itself is suitable for subsequent applications, including pyrolysis.

As will be appreciated with reference to FIGS. 3 and 3A, the system 1 is constructed and operates such that different types of 2D materials are combined. For example, 2D material that has gone through dry cleaning at station 150 is combined with clean 2D material from station 340 (which did not require a cleaning step to be performed thereon). Moreover, further examples of combining different processed materials include the combining of different materials that require densification. For example, the bidirectional belt 310 and mixing bins 630, 730 are locations in which the 2D streams could be combined with dust/material from Line A for blending. Blending these different forms and types of materials could result in the target composition.

Combination of Facilities→Process Efficiency

The system 1 also incorporates operations found at several types of waste processing facilities, including material recovery facilities (MRFs) and mechanical recycling facilities, under a "single roof" with a condensed footprint.

Typical MRFs receive mixed recyclable materials from consumers through municipal single-stream recycling programs, where items like plastic containers and cardboard boxes are collected together in one bin. At the MRF, mechanical sorting equipment—such as screens and air separators—is used to separate this commingled stream into different commodity types including plastics, metals, and paper, while removing non-recyclable or unwanted items. For instance, MRFs specifically target PET plastic water bottles, which are sorted out, baled, and stored for sale to downstream processors like mechanical recycling companies. This same process is used for other valuable materials, allowing MRFs to produce separate bales for various plastic resins, fibers, and metals. Ultimately, MRFs serve as the first step in the recycling supply chain by turning a mix of household recyclables into sorted, marketable commodities for further processing.

Typical mechanical plastic recycling facilities purchase sorted plastic waste, such as PET plastic bales, and process it into clean plastic pellets for use in manufacturing. Unlike facilities that handle mixed recyclables, these recyclers specialize in plastics and are not equipped to manage materials containing large amounts of metals or other contaminants. Because they receive relatively consistent and pre-sorted input materials, their processes are standardized and efficient. The incoming plastic is subjected to steps like fine shredding, washing, dry cleaning, extrusion, and pelletizing. The resulting product—clean plastic pellets—has been significantly transformed from the original waste and can be sold to manufacturers for further molding and production.

As previously mentioned, the present system 1 combines the primary activities of these two otherwise distinct facilities—a MRF and a plastic recycler—into one operation, as sorting equipment found in MRFs and secondary processing equipment used in mechanical recycling facilities are included to centralize processing at one location. Similar to a MRF, inbound material is sorted and separated into residual waste and recovered recyclables, such as plastic, metal, and fiber that may be prepared for sale to third-party recyclers. While sorted material at a MRF is sold as the facility output, employing our system, such sorted material would be further processed. Like a plastic recycler, the desired plastics in the present system 1, including certain source-separated materials, continue onwards to specialized processing, such as further size reduction, cleaning, and/or densification.

While it may be possible to place the equipment used at both MRFs and mechanical recyclers under one roof, the system 1 is structured in way to streamline operations for specific materials. Existing facilities do not allow for the operational flexibility created by the present system 1. In contrast with the MRFs and mechanical recycling plastics processing facilities that employ a single or independent processing line, the multi-line approach described herein employs multiple infeed and merge points throughout the system 1. The system 1 extends beyond a simple placement of equipment and instead incorporates intentional design features to connect two otherwise separate business models. Instead of stopping at the sorting stage, the system 1 extends capabilities with secondary processing equipment to further manufacture plastics into a finished feedstock product. The flexibility of routing material through the system 1 beyond simple sortation allows for more efficient processing of a diverse set of waste streams. The system 1 expands the functionality at one location, with a reduced footprint, by allowing for streamlined sortation and secondary processing in a system of connected lines.

The consolidation of these business models minimizes unnecessary transportation of material and creates process efficiency in the plastics recycling and manufacturing supply chain. Instead of moving material several times from facility to facility, material can undergo sortation and secondary processing in one location. The current alternative would involve shipping material from MRFs to a mechanical recycler to the manufacturer (and buyer of recycled plastic), whereas the system 1 described herein allows material to move from the centralized facility directly to the downstream manufacturer without further processing. The system 1 clearly affords several logistical benefits that include reducing the amount of time required to load and unload material, as well as decreasing the risk of loss or damage by decreasing the amount of times that material is handled. Additionally, there are economic savings from reducing labor and transportation costs and the need for two separate storage and processing facilities.

The system 1 also provides economic opportunities by creating a higher value end-use material as compared to an intermediate product requiring additional preparation. MRFs market plastic product bales depending specific resin type (e.g., PET or PP) or by form (e.g., rigid plastics or containers). Furthermore, the system 1 allows for streamlined capture of plastic types that are generally not recovered at traditional MRFs, such as film material. Many MRFs do not target film recovery, so film plastics end up in residue bales (bound for disposal) or 3-7 plastic bales, which are low value due to high levels of contamination. The system 1 uses additional processing steps to create a marketable product with low levels of contamination that is in a form ready for downstream manufacturing. As described, the combination of several processes in a central location increases overall efficiency both from a logistical and economic standpoint.

Exemplary Plastic Processing System 1

Now turning to FIGS. 3 and 3A, one exemplary plastic processing facility employing system 1 is composed of multiple infeed lines A-H to accommodate the different types of material that are processed. Once again, each of the infeeds A-H comprises a plastic material with distinct characteristics that can be blended into finished feedstock product and is suitable for processing in downstream applications, such as pyrolysis.

For example, in the figure, there is a first infeed (line) labeled "A" for plastic dust or fines (plastics), a second infeed (line) labeled "B" for small form, shredded mixed plastic requiring mechanical sortation, a third infeed (line) labeled "C" for medium form, unshredded mixed plastic requiring mechanical sortation, a fourth infeed (line) labeled "D" for large form, mixed material requiring mechanical sortation, a fifth infeed (line) labeled "E" for large form, source-separated material, a sixth infeed (line) labeled "F" for small form, source-separated material, a seventh infeed (line) labeled "G" for large form material requiring dry cleaning and removal of small contaminants, and an eighth infeed (line) labeled "H" for large form material requiring (non-plastic) core removal.

Once again, it will be understood that there can be less than or even more than the illustrated eight infeed lines A-H. It will also be understood that there can be more or less than eight infeed lines running concurrently, as some lines may be offline to accommodate maintenance requirements or capacity constraints.

The infeed lines A-H bring the material through various steps of the process including sizing, sorting, fine shredding, cleaning, and densifying. The infeed lines handle different input streams separately and then converge at various points of the process as illustrated in the exemplary process.

Each of the illustrated infeed lines A-H will now be described; however, it will be understood that various stations along each line are exemplary in nature and not limiting since other station designs may be possible. For each line, characteristics of material (feedstock) that can be supplied to that line is listed and it will be appreciated that the feedstocks are comprised of plastic materials that may be commingled with other contaminants.

In FIGS. 3 and 3A, the various infeed materials and infeed lines are at the left side of FIG. 3 and are labeled from A (top) to H (bottom) with appropriate identification labels.

In addition, it will be appreciated that the one or more sizing stations comprise stations 10, 110, 210, 310; the one or more sorting stations comprise stations 20, 120, 220, 320; the one or more fine shredding stations comprise stations 40, 140, 240, 340; the one or more cleaning stations comprise stations 50, 150; and the one or more densification stations comprise stations 60, 160.

Line A—Dust (from Plastics).

Infeed line A is configured to process dust from plastics or fine plastic particles. Line A is constructed such that the dust material is conveyed directly to station 630 which comprises a metering bin. It will be appreciated that the term "conveyed" is intended to cover different means for delivering the material from location A to location B and typically, in a processing line setting, will comprise a screw conveyor, conveyor belt, pneumatic conveyor (a closed pipeline that moves material with air pressure), or similar equipment. Specifically, the infeed from line A is pneumatically conveyed through the system. Afterwards, the dust material is sent to station 60 for agglomeration. As is known, agglomeration is a type of densification that increases the bulk density of plastic waste, making it easier to handle and transport. Plastic agglomeration is thus a process that transforms loose or fine plastic materials into larger, denser chips or granules. This process, often used in recycling and production, aims to improve handling, transportation, and processing of plastic materials. Accordingly, station 60 can broadly be characterized as being a densification station.

It will also be seen that one end of a bidirectional belt 302 is in communication with the station 630. The bidirectional belt 302 is discussed in greater detail below.

Line B—Small Form, Shredded Mixed Plastics

Infeed line B is configured to process small form, shredded mixed plastics. In general, small form, shredded mixed plastics refers to plastic waste is 80 mm or less and may be mixed with other non-plastic contaminants.

The material (small form, shredded mixed plastics) is sent to station 20 for density separation, where it is split into two fractions by density (either light or heavy). Conventional density separation equipment can be used at station 20. The two fractions can be processed differently. For example, from the station 20, any undesirable fraction may be sent to a residue station (not illustrated) for disposal, and a different, desired fraction may be sent to a metering bin at station 430 to be further directed. As indicated in the figure by the double dotted line, the desired fraction that is sent to the metering bin at station 430 comprises a 3D plastic material.

Line C—Medium Form, Unshredded Mixed Plastics

Infeed Line C is configured to process medium form, unshredded mixed plastics. In general, medium form, unshredded mixed plastic refers to a quantity of mixed plastic waste that is between 80 mm and 260 mm, needs further sizing, and is a mixture of various types of plastic materials. It is distinct from shredded plastic, which has been processed into smaller pieces, and from individual types of plastic.

The material of Line C is transported to station 10 for granulation. After the granulation step at station 10, material is sent to the bidirectional belt 300. Material that needs further separation will either get sent to station 20 for density separation or station 120 for air classification separation. Material that does not need further sortation will continue to another bidirectional conveyor that directs it to a metering bin at either station 630 or station 730.

Line D—Large Form, Mixed Material (Plastics)

Infeed Line D is configured to process large form, mixed plastics. In general, large form, mixed plastics can refer to a category of scrap plastic that includes bales of post-consumer plastic waste which needs sortation.

Infeed material at Line D has the option to be sent to either a rotor shredder at station 210 or a hook shredder at station 110, where any bales will be liberated, and all material is shredded. In the event, that the infeed material is transported to station 110, the sized material is then fed onto a reversible conveyor (bidirectional belt 304) that may direct material to station 220 for the primary mechanical sortation equipment. In the event, that the infeed material is transported to station 220, the sized material is then fed onto a reversible conveyor (bidirectional belt 306) for transport to fine shredding stations as set forth in the figure.

The equipment at station 220 is configured to perform a series of steps resembling a traditional single-stream MRF's front-end sortation system, including equipment such as magnets, screens, optical sorters, or ballistic separators. This station 220 will sort material into several fractions, namely, 2D plastic, 3D plastic, other recoverable recyclables (e.g., ferrous metals, aluminum, or PET plastic), and residual material. Station 220 can comprise any number of different types of traditional equipment.

In the attached figure, the other recoverable recyclables are individually identified as follows: ferrous metals 400, aluminum (UBC) 410, and PET plastic 420. Each of these recyclables 400, 410, 420 comprise a commodity for third party sale.

From the previous sortation step, 3D material continues to station 30, a metering bin for 3D materials. There may be a quality control step in which contaminants are removed.

Afterwards, the 3D material goes through station 40, where dirty 3D material is fine shredded to a specified size to meet the bulk density requirements of a downstream application. In other words, in view of the desired characteristics of the output of Line D, the material is shred to a target size. Once the 3D material is shredded, material will be sent to station 430, another metering location prior to station 50 for dry cleaning of the 3D material.

The 3D material at station 50 enters a dryer in which small contaminants are removed and sent to the residue station and the other fraction continues to station 70 for storage. It will thus be understood that the Line D comprises an infeed line that produces an output that is delivered to station 70 for storage without undergoing a densification process. As will be described herein, 3D material does not undergo a densification process but still forms a part (fraction) of the finished feedstock product.

The 2D material from the sorting station 220 goes to the station 130 for metering and applicable quality control checks prior to shredding at station 140 (2D dirty fine shredding). After fine shredding at station 140, material is metered at station 530 and then sent to 2D dry cleaning at station 150.

From dry cleaning station 150, removed contaminants or fluff is sent to a residue station (not illustrated). Cleaned 2D product is joined, under certain operating conditions, with other shredded 2D material (e.g., from station 340 described below) and sent to the bidirectional conveyor belt 302 for selection of the appropriate densification process. The belt provides the option for material to go to either station 630 (mixing bin), which directs to station 60 for the agglomeration step, or station 730 (mixing bin), which directs to station 160 for the alternate densification step.

Following densification at station 160, material is routed to storage.

It will be appreciated that one important feature of Line D is that the cleaned 2D material from station 150 can be routed to the two different densification processes based on the material characteristics of the 2D material exiting the station 150. Based on the material characteristics of the infeed at Line D, the bidirectional conveyor belt 302 is set to transport in one selected direction (either towards station 630 or towards station 730).

In addition, cleaned 2D product from station 150 may be joined with other shredded 2D material (such as from station 340) to the extent all such 2D shredded materials are compatible since once joined and delivered to the bidirectional conveyor belt 302, the joined material must be delivered to the same station 630 or station 730 (given the selected transport direction of the belt 302) to undergo the same type of densification at the same densification station.'

Line E—Large Form, Source-Separated (Plastics)

Infeed Line E is configured to process large form, source-separated plastics. In general, large form, source-separated plastics refers to plastic recyclables that are already sorted or do not need further sorting, such as post-industrial manufacturing waste.

With respect to Line E, the operator will select either 2D or 3D plastic material that is input. Similar to the infeed in Line D, infeed material at Line E has the option to be sent either to the rotor shredder at station 210 or to the hook shredder at station 110. At station 210, material will be shredded with a single shaft shredder. In this manner, both Lines D and E are interconnected at an upstream location prior to the first processing step. If material does not need additional sorting, then it will be directed to another bidirectional conveyor 306 for appropriate fine shredding at downstream stations. Accordingly, shredded plastic material from station 110 goes to belt 304, while shredded plastic material from station 210 goes to belt 306.

Depending on whether infeed material is 2D or 3D, it will get sent accordingly to either the station 230 for 3D metering or station 330 for 2D metering prior to fine shredding.

Fine shredding occurs at station 240 for 3D material, which requires a smaller screen size for finished feedstock product specifications. Fine shredding for 2D material happens at station 340, where material is sized to meet downstream densification infeed requirements. After the fine shredding step, material at station 240 gets combined with material from station 50 (3D dry cleaning) and is moved to storage at station 70 without undergoing a densification step.

2D material after fine shredding is combined with material from station 150 and then sent to the bidirectional belt 302 for densification selection. More specifically, this material can be transported by the belt 302 to either the densification (agglomeration) station 60 or to the densification station 160.

Line F—Small Form, Source-Separated (Plastics)

Infeed Line F is configured to process small form, source-separated plastics.

Similar to Line E, the operator will select either 2D or 3D material that is input as the infeed material to Line F.

Material may then be combined with material from either (or both) Line D or E on a bidirectional conveyor 308 between stations 230 and 330, the metering bins for 3D and 2D material, respectively.

As illustrated and previously mentioned, the 3D material processed along Line F gets combined with material from station 50 (3D dry cleaning) after the fine shredding step at station 240 and is moved to storage at station 70 without undergoing a specific densification step.

Line G—Large Form, Dirty 2D (Plastics)

Infeed Line G is configured to process large form, dirty plastics.

The infeed material is transported to station 320 to go through a trommel or similar equipment that creates an agitation movement to remove small, heavy contaminants. Those small, heavy contaminants are directed to a residue location at a residue station (not illustrated).

The remaining material goes to station 130 (mixing bin) as an additional quality control measure, and additional contaminants are removed. As illustrated, the mixing bin 130 also receives 2D material from the sort station 220. Afterwards, it follows the line for the fine shredding (station 140), additional metering (station 530), cleaning (station 150), and densification steps (at either station 60 or station 160 depending on the transport direction of the belt 302) prior to storage at station 70.

Line H—Large Form, Rolls (Plastics)

Infeed Line H is configured to process large form, plastic rolls (e.g., plastic film rolls, agricultural film rolls, etc.).

After being fed into the Line H, the roll material is transported to station 310 where any cardboard (or other non-plastic) cores are separated from the plastic material. After separation at station 310, the plastic roll material is combined with other clean 2D material at station 330 (mixing bin) and follows the line for fine shredding (station 340), and densification processing at station 60 or station 160 (depending on the transport direction of the belt 302) prior to storage.

As illustrated in FIGS. 3 and 3A and mentioned herein, one of the advantages of the present system 1 is the use of multiple independent infeed lines (e.g., A-H) that can handle a wide range of different types of plastic materials (e.g., different presorted and unsorted plastics) that generate a plurality of processed material outputs that ultimately define the finished feedstock product. The use of multiple infeed lines and the generation of different processed material outputs provides a high degree of customization and efficiency since each line is specifically tailored to the type of infeed material that is being introduced to the infeed line and also in view of the finished feedstock product thus, the infeed material is not subjected to superfluous, time-consuming processing. This can be seen in FIGS. 3 and 3A in which multiple lines produce a combined material output that is not subjected to a densification step but instead is delivered directly to storage. In contrast, other infeed lines produce material outputs that require densification. This system architecture allows for multiple types of material outputs, such as granules, flakes and pellets, to be delivered to the storage location.

It is to be understood that like numerals in the drawings represent like elements through the several figures, and that not all components and/or steps described and illustrated with reference to the figures are required for all embodiments or arrangements.

Thus, illustrative embodiments and arrangements of the present devices and methods provide a method for processing input material to optimize polyolefin recovery. The flowchart in the figures illustrates the operation of possible implementations of methods according to various embodiments and arrangements. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

It will also be appreciated that in FIGS. 3 and 3A, the lines between the various stations and/or the equipment in system 1 indicate a device for transporting material between the stations/equipment. For example, the device can be a conveyor belt or the like; enclosed transporting conduits, a series of containers forming a train along a conveyor, etc.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the present disclosure, which is set forth in the following claims.

What is claimed is:

1. A multi-line plastic processing system for producing a finished feedstock product that is suitable for undergoing subsequent processing, the system comprising:

a plurality of feedstock lines for receiving and processing different plastic feedstock materials;

wherein the system includes a first densification station for densifying one or more processed plastic feedstock materials; and a storage station for storing the finished feedstock product;

wherein the system is configured such that a plurality of output streams from the plurality of feedstock lines define the finished feedstock product and at least one of the plurality of output streams comprises a non-densified output stream that bypasses the first densification station;

wherein the plurality of feedstock lines comprises a first line for receiving large form, mixed plastic materials and a second line for receiving large form, source-separated plastic materials, each of the first line and second line being in selective communication with a hook shredder and a rotor shredder for sizing the plastic feedstock materials; and wherein the hook shredder is in communication with a first bidirectional conveyor and the rotor shredder is in communication a second bidirectional conveyor that bypasses the first bidirectional conveyor, wherein each of the first bidirectional conveyor and the second bidirectional conveyor are in communication with a sorting station when the first bidirectional conveyor and the second bidirectional conveyor operate in a first direction and are in communication with one or more shredding stations when the first bidirectional conveyor and the second bidirectional conveyor operate in a second direction, whereby the sorting station is bypassed.

2. The system of claim 1, wherein the subsequent processing comprises pyrolysis processing for transforming the finished feedstock product into liquid hydrocarbons.

3. The system of claim 1, wherein the plastic feedstock materials include plastic feedstock materials to be shredded and plastic feedstock materials that by-pass shredding.

4. The system of claim 1, further including a second densification station for densifying one or more other processed plastic feedstock materials, wherein the first densification station utilizes a first densification process that is different than a second densification process utilized at the second densification station, wherein the first densification station is at a first location and the second densification station is at a second location spaced from the first location.

5. The system of claim 4, wherein the plurality of output streams comprise: 1) a first densified output stream produced at the first densification station and comprising a first densified, processed plastic material; and 2) a second densified output stream produced at the second densification station and comprising a second densified, processed plastic material; and wherein the non-densified output stream bypasses both of the first and second densification stations.

6. The system of claim 1, wherein the sorting station is configured to sort material into several fractions including 2D plastics, 3D plastics, other recoverable recyclables, and residual material.

7. The system of claim 4, wherein the different plastic feedstock materials comprises plastic film material that is processed by one of the first densification station and the second densification station without being comingled with rigid plastic material.

8. A multi-line plastic processing system for producing a finished feedstock product that is suitable for undergoing subsequent processing, the system comprising:

a plurality of feedstock lines for receiving and processing different plastic feedstock materials, wherein at least two feedstock lines of the plurality of feedstock lines have different initial processing stations located at a single site location at which the plurality of feedstock lines are located;

wherein the system includes a first densification station for densifying one or more processed plastic feedstock materials; and a storage station for storing the finished feedstock product;

wherein the system is configured such that a plurality of output streams from the plurality of feedstock lines define the finished feedstock product and at least one of the plurality of output streams comprises a non-densified output stream that bypasses the first densification station;

a second densification station for densifying one or more other processed plastic feedstock materials, wherein the first densification station utilizes a first densification process that is different than a second densification process utilized at the second densification station, wherein the first densification station is at a first location and the second densification station is at a second location spaced from the first location;

wherein the plastic feedstock materials comprise 3D plastics and 2D plastics and the at least one of the plurality of output streams that bypasses the first and second densification stations comprises a processed 3D plastics output stream and the 2D plastics are processed to form a processed 2D plastics output stream that is transported to a bidirectional conveyor that is in communication with the first densification station when the bidirectional conveyor operates in a first direction and is in communication with the second densification station when the bidirectional conveyor operates in a second direction.

9. The system of claim 8, wherein the system further includes one or more sizing stations, one or more sorting stations, one or more fine shredding stations, and one or more cleaning stations.

10. The system of claim 9, wherein the system is configured such that wherein the one or more different plastic feedstock materials can bypass one or more stations selected from the group consisting of the one more sizing stations, the one or more sorting stations, the one or more fine shredding stations and the one or more cleaning stations.

11. The system of claim 9, wherein the system is configured such that wherein the one or more different plastic feedstock materials can bypass the one or more cleaning stations.

12. A multi-line plastic processing system for producing a finished feedstock product that is suitable for undergoing subsequent processing, the system comprising:

a plurality of feedstock lines for receiving and processing different plastic feedstock materials, wherein at least two feedstock lines of the plurality of feedstock lines have different initial processing stations located at a single site location at which the plurality of feedstock lines are located;

wherein the system includes a first densification station for densifying one or more processed plastic feedstock materials; and a storage station for storing the finished feedstock product;

wherein the system is configured such that a plurality of output streams from the plurality of feedstock lines define the finished feedstock product and at least one of the plurality of output streams comprises a non-densified output stream that bypasses the first densification station; and wherein the plurality of feedstock lines comprise a first infeed that comprises plastic dust, a second infeed that comprises medium form, unshredded mixed plastic requiring mechanical sortation, a third infeed that comprises small form, shredded mixed rigid plastic requiring mechanical sortation, a fourth infeed that comprises large form, mixed material requiring mechanical sortation, a fifth infeed that comprises large form material requiring dry cleaning and removal of small contaminants, a sixth infeed that comprises large form material requiring core removal, a seventh infeed that comprises large form, source-separated material, and an eighth infeed that comprises small form, source-separated material.

13. A multi-line plastic processing system for producing a finished feedstock product that is suitable for undergoing subsequent processing, the system comprising:

a plurality of feedstock lines for receiving and processing different plastic feedstock materials, wherein at least two feedstock lines of the plurality of feedstock lines have different initial processing stations located at a single site location at which the plurality of feedstock lines are located;

wherein the system includes a first densification station for densifying one or more processed plastic feedstock materials; and a storage station for storing the finished feedstock product;

wherein the system is configured such that a plurality of output streams from the plurality of feedstock lines define the finished feedstock product and at least one of the plurality of output streams comprises a non-densified output stream that bypasses the first densification station; and wherein the plurality of feedstock lines comprises a first line for receiving large form, mixed plastic materials and a second line for receiving large form, source-separated plastic materials, each of the first line and second line being in selective communication with a hook shredder and a rotor shredder for sizing the plastic feedstock materials, wherein each of the first line and the second line are in selective communication with: (1) a main sorting line that includes sorting equipment that is capable of processing both 2D plastic materials and 3D plastic materials; and (2) a shredding line that includes: a 3D shredding pathway and a 2D shredding pathway.

14. The system of claim 13, wherein the hook shredder is in communication with a first bidirectional conveyor and the rotor shredder is in communication a second bidirectional conveyor that bypasses the first bidirectional conveyor, wherein each of the first bidirectional conveyor and the second bidirectional conveyor are in communication with a sorting station located along the main sorting line when the first bidirectional conveyor and the second bidirectional conveyor operate in a first direction and are in communication with a third bidirectional conveyor that is in communication with the 3D shredding pathway when the third bidirectional conveyor operates in a first direction and is in communication with the 2D shredding pathway when the third bidirectional conveyor operates in a second direction.

15. A multi-line plastic processing system for producing a finished feedstock product that is suitable for undergoing subsequent processing, the system comprising:

a plurality of feedstock lines for receiving and processing different plastic feedstock materials including a first plastic feedstock material and a second plastic feedstock material;

wherein the system includes a densification station for densifying one or more processed plastic feedstock materials; and a storage station for storing the finished feedstock product;

wherein the plurality of feedstock lines comprises a first line configured to receive the first plastic feedstock material and a separate second line configured to receive the second plastic feedstock material, with each of the first line and second line being in selective communication with a hook shredder and a rotor shredder for sizing the plastic feedstock materials, wherein the hook shredder and the rotor shredder are separate pieces of equipment with the hook shredder being along the first line at a different location than the rotor shredder which is along the second line, wherein each of the first line and the second line are in selective communication with: (1) a main sorting line that includes sorting equipment that is capable of processing both 2D plastic materials and 3D plastic materials; and (2) a shredding line that includes: a 3D shredding pathway and a 2D shredding pathway.

16. The system of claim 15, wherein the hook shredder is in communication with a first bidirectional conveyor and the rotor shredder is in communication a second bidirectional conveyor that bypasses the first bidirectional conveyor, wherein each of the first bidirectional conveyor and the second bidirectional conveyor are in communication with a sorting station located along the main sorting line when the first bidirectional conveyor and the second bidirectional conveyor operate in a first direction and are in communication with a third bidirectional conveyor that is in communication with the 3D shredding pathway when the third bidirectional conveyor operates in a first direction and is in communication with the 2D shredding pathway when the third bidirectional conveyor operates in a second direction.

17. The system of claim 15, wherein there is only one storage station to store the finished feedstock product which is only received at the one storage station undergoes no processing at the one storage station.

18. The system of claim 15, wherein the first densification station comprises an agglomeration station.

19. The system of claim 15, wherein the first densification station comprises an agglomeration station and the second densification station comprises a pelletizing station.

20. The system of claim 19, wherein the agglomeration station receives processed feedstock materials from at least two different feedstock lines of the plurality of feedstock lines.

21. The system of claim 19, wherein the plurality of output streams further comprises a first output stream, and a second output stream, wherein the first output stream is outputted from the agglomeration station and the second output stream is outputted from the pelletizing station.

22. A multi-line plastic processing system for producing a finished feedstock product that is suitable for undergoing subsequent processing, the system comprising:

a plurality of feedstock lines for receiving and processing different plastic feedstock materials, wherein at least two feedstock lines of the plurality of feedstock lines have different initial processing stations located at a single site location at which the plurality of feedstock lines are located;

wherein the system includes a first densification station for densifying one or more processed plastic feedstock materials;

a storage station for storing the finished feedstock product;

wherein the system is configured such that a plurality of output streams from the plurality of feedstock lines define the finished feedstock product and at least one of the plurality of output streams comprises a non-densified output stream that bypasses the first densification station; and a bypass line in which the non-densified output stream bypasses the first densification station, the bypass line terminating at the storage station for delivering the non-densified output stream to the storage station, wherein the bypass line includes a metering station and a shredding station both upstream of the storage station.

23. The system of claim 22, wherein the plurality of feedstock lines comprises a first line for receiving large form, mixed plastic materials and a second line for receiving large form, source-separated plastic materials, each of the first line and second line being in selective communication with a hook shredder and a rotor shredder for sizing the plastic feedstock materials, wherein the hook shredder and the rotor shredder are separate pieces of equipment at different locations.

24. The system of claim 22, wherein at least two feedstock lines of the plurality of feedstock lines converge at a location upstream of the storage station.

25. A multi-line plastic processing system for producing a finished feedstock product that is suitable for undergoing subsequent processing, the system comprising:

a plurality of feedstock lines for receiving and processing different plastic feedstock materials, wherein at least two feedstock lines of the plurality of feedstock lines have different initial processing stations located at a single site location at which the plurality of feedstock lines are located;

wherein the system includes a first densification station for densifying one or more processed plastic feedstock materials; and a storage station for storing the finished feedstock product;

wherein the system is configured such that a plurality of output streams from the plurality of feedstock lines define the finished feedstock product and at least one of the plurality of output streams comprises a non-densified output stream that bypasses the first densification station; and wherein the plurality of feedstock lines includes a first feedstock line and a separate second feedstock line, the first feedstock line including first and second processing stations that are both upstream of the storage station, the second feedstock line including third and fourth processing stations that are both upstream of the storage station, wherein the first, second, third and fourth processing stations are different stations from one another and are located at different locations.

26. A multi-line plastic processing system for producing a finished feedstock product that is suitable for undergoing subsequent processing, the system comprising:

a plurality of feedstock lines for receiving and processing different plastic feedstock materials, wherein at least two feedstock lines of the plurality of feedstock lines have different initial processing stations located at a single site location at which the plurality of feedstock lines are located;

wherein the system includes a first densification station for densifying one or more processed plastic feedstock materials;

a storage station for storing the finished feedstock product;

wherein the system is configured such that a plurality of output streams from the plurality of feedstock lines define the finished feedstock product and at least one of the plurality of output streams comprises a non-densified output stream that bypasses the first densification station; and a bypass line in which the non-densified output stream bypasses the first densification station, the bypass line terminating at the storage station for delivering the non-densified output stream to the storage station, wherein the bypass line has a processing station that is also connected to one feedstock line of the plurality of feedstock lines at a location upstream of the storage station, the one feedstock line being in communication with the first densification station.

27. The system of claim 26, wherein the storage station comprises a final station of the system.

* * * * *